United States Patent
Abe

(10) Patent No.: US 10,668,519 B2
(45) Date of Patent: Jun. 2, 2020

(54) METHOD FOR MANUFACTURING GASKET-CONSTITUTING PLATE

(71) Applicant: Kokusan Parts Industry Co., Ltd., Toyonaka-shi (JP)

(72) Inventor: Yoshitaka Abe, Toyonaka (JP)

(73) Assignee: KOKUSAN PARTS INDUSTRY CO., LTD., Toyonaka-shi (JP)

( * ) Notice: Subject to any disclaimer, the term of this patent is extended or adjusted under 35 U.S.C. 154(b) by 0 days.

(21) Appl. No.: 16/236,760

(22) Filed: Dec. 31, 2018

(65) Prior Publication Data

US 2019/0210085 A1 Jul. 11, 2019

(30) Foreign Application Priority Data

Jan. 5, 2018 (JP) ................................. 2018-000588

(51) Int. Cl.
| | |
|---|---|
| *B21D 28/26* | (2006.01) |
| *B21D 53/84* | (2006.01) |
| *B21D 19/08* | (2006.01) |
| *F02F 11/00* | (2006.01) |
| *F16J 15/08* | (2006.01) |

(52) U.S. Cl.
CPC ............. *B21D 28/26* (2013.01); *B21D 19/08* (2013.01); *B21D 53/84* (2013.01); *F02F 11/002* (2013.01); *F16J 15/0818* (2013.01)

(58) Field of Classification Search
CPC ...... B21D 28/28; B21D 28/26; B21D 28/265; B21D 28/24; B21D 28/32; B21D 28/3416; B21D 28/243; B21D 28/285; B21D 28/343; B21D 35/002; B21D 35/001; B21D 19/08
See application file for complete search history.

(56) References Cited

U.S. PATENT DOCUMENTS

| | | | | |
|---|---|---|---|---|
| 5,582,415 A | * | 12/1996 | Yoshida | F16J 15/0825 277/592 |
| 5,938,208 A | * | 8/1999 | Yoshida | F16J 15/0818 277/592 |
| 6,073,938 A | * | 6/2000 | Abe | F16J 15/104 277/644 |

(Continued)

FOREIGN PATENT DOCUMENTS

| | | |
|---|---|---|
| JP | 04-044456 U | 4/1992 |
| JP | 5-052267 A | 3/1993 |

(Continued)

*Primary Examiner* — Pradeep C Battula
(74) *Attorney, Agent, or Firm* — Kratz, Quintos & Hanson, LLP

(57) ABSTRACT

Provided is a method for manufacturing a gasket-constituting plate made of metal, in which a folded-back part whose thickness is set to be less than the thickness of a general part is provided at a periphery of a combustion chamber hole. The method includes, with a raw metal plate being held between a blank holder and a drawing die having an extrusion hole, extruding the raw metal plate in a thickness direction thereof by using a drawing punch as an extrusion tool to form a projecting part in the raw metal plate, and causing a tensile force to act on the raw metal plate due to the extrusion so as to elongate the raw metal plate, to form a thin peripheral wall part at an outer peripheral portion of the projecting part.

6 Claims, 17 Drawing Sheets

(56) References Cited

U.S. PATENT DOCUMENTS

| | | | | |
|---|---|---|---|---|
| 6,257,591 B1 * | 7/2001 | Abe | .................... | F16J 15/0806 |
| | | | | 277/591 |
| 6,299,175 B1 * | 10/2001 | Maekawa | ............ | F16J 15/0825 |
| | | | | 277/593 |
| 8,939,452 B2 * | 1/2015 | Matsushita | ............ | B21D 53/84 |
| | | | | 277/590 |

FOREIGN PATENT DOCUMENTS

| | | |
|---|---|---|
| JP | H5-52267 A | 3/1993 |
| JP | 07-041139 U | 7/1995 |
| JP | H7-41139 U | 7/1995 |
| JP | 11-063228 A | 3/1999 |
| JP | H11-63228 A | 3/1999 |
| JP | 11-241769 A | 9/1999 |
| JP | 2007-924 A | 1/2007 |
| JP | 2015-197169 A | 11/2015 |

* cited by examiner

METHOD FOR MANUFACTURING GASKET-CONSTITUTING PLATE

BACKGROUND

Field of the Invention

The present invention relates to a method for manufacturing a gasket-constituting plate made of metal.

Description of the Background Art

In an engine such as an automobile engine, a head gasket, which is composed of one or a plurality of gasket-constituting plates made of metal, is interposed between a cylinder head and a cylinder block. This head gasket seals a combustion chamber, a lubricating oil passage, a cooling water passage, etc., between the cylinder head and the cylinder block.

As for the gasket-constituting plate, one configured as follows has been put to practical use. That is, the gasket-constituting plate includes: an opening corresponding to a combustion chamber; a folded-back part provided at an inner peripheral edge of the opening; and an annular bead surrounding the folded-back part. A gap corresponding to the thickness of the folded-back part is provided, near the bead, between the cylinder head and the cylinder block to avoid deterioration in sealing performance, which is caused by the bead being completely compressed.

Meanwhile, in order to improve sealing performance by adjusting the surface pressure of the bead, the thickness of the entire folded-back part is made less than the thicknesses of other parts, or the thickness of the folded-back part is made greater in a portion of the folded-back part in the circumferential direction (for example, a portion between adjacent combustion chambers or a portion away from a head bolt) than in other portions in the circumferential direction (refer to Patent Literatures 1 and 2, for example). As a method for forming the folded-back part in a thin manner, Patent Literature 1 describes press molding, etching, cutting, etc., while Patent Literature 2 describes coining (pressing) and cutting.

Meanwhile, a head gasket configured as follows has been proposed. That is, the head gasket includes three gasket-constituting plates, i.e., a bead plate, a stopper plate, and a spacer plate. Without adjusting the thickness of a folded-back part of the stopper plate, an annular thin part extending flatly from the spacer plate is formed so as to oppose the folded-back part, thereby adjusting the surface pressure of a bead (refer to Patent Literature 3, for example).

CITATION LIST

Patent Literature

[Patent Literature 1] Japanese Unexamined Patent Application Publication No. H5-52267
[Patent Literature 2] Japanese Unexamined Patent Application Publication No. H11-063228
[Patent Literature 3] Japanese Unexamined Utility Model Application Publication No. H7-41139

SUMMARY OF THE INVENTION

Technical Problem

However, processing a thin folded-back part or a thin part through press molding as described in Patent Literature 1 or 2 has the following drawbacks. Specifically, the thickness of a raw metal plate itself is as extremely thin as about 0.2 mm, for example, which requires the raw metal plate to be pressed by using a large-scale pressing machine having a high pressing force. This may cause an increase in economic burden in terms of facilities. Moreover, it is difficult to practically adjust the thickness of a raw metal plate to an appropriate thickness of a micron order by using such a large-size pressing machine.

In addition, when the plate thickness is adjusted through etching, the concentration and/or temperature conditions of an etchant, the immersion time in the etchant, etc., need to be appropriately adjusted, which makes it difficult to manufacture a raw metal plate having an appropriate thickness of a micron order, without variation in thickness from product to product. In addition, washing and masking are required as pre-etching processes, and washing and mask removal are required as post-etching processes, which result in an inevitable increase in the number of process steps. Moreover, disposal of waste etchant is required, which results in an increase in the manufacturing cost of gasket-constituting plates. In particular, in order to change the thickness of a folded-back part according to portions thereof in the circumferential direction, a set of masking and etching steps needs to be repeated multiple times with the masking range being changed stepwise, which requires extremely complicated work.

A raw metal plate needs to be cut into an appropriate thickness of a micron order. If the plate thickness is adjusted through cutting, the machining time inevitably increases and the machining cost increases for satisfying such an appropriate thickness. Therefore, the cutting is not suitable for mass production. In addition, if the cutting is performed to cut a raw metal plate, mechanical strength of a folded-back part may be reduced.

Accordingly, a gasket-constituting plate having partially thin portions has not yet been put to practical use at present, though a concept of such configuration of the gasket-constituting plate has been proposed in Patent Literatures 1 to 3.

An object of the present invention is to provide a gasket-constituting plate manufacturing method capable of manufacturing a gasket-constituting plate, in which the thickness of a specific part such as a folded-back part is adjusted to an appropriate thickness efficiently and precisely, while using inexpensive facilities.

Solution to Problem

The present invention has the following features to attain the object mentioned above.

(1) A method for manufacturing a gasket-constituting plate, including causing a tensile force to act on a specific portion of a raw metal plate to elongate the specific portion, and machining the specific portion into a thin part thinner than other portions of the raw metal plate.

According to this manufacturing method, through a simple machining method of causing a tensile force to act on a specific portion of a raw metal plate to elongate the specific portion, a gasket-constituting plate can be manufactured such that the specific portion is efficiently made thin by using inexpensive facilities such as a drawing machine. Moreover, when the amount of elongation of the specific portion is appropriately set, the thickness of the thin part can be appropriately adjusted with high precision.

(2) A method for manufacturing a gasket-constituting plate made of metal, the gasket-constituting plate having an annular thin part whose thickness is set to be less than a thickness of a general part, the method including: (a) with a raw metal plate of the gasket-constituting plate being held by a holding tool having an extrusion hole, extruding a part-to-project, of the raw metal plate, facing the extrusion hole, in a thickness direction of the raw metal plate by using an extrusion tool, thereby forming a projecting part in the raw metal plate, and causing a tensile force to act on the raw metal plate due to the extrusion so as to elongate the raw metal plate, thereby forming, at an outer peripheral portion of the projecting part, a thin peripheral wall part thinner than the raw metal plate; and (b) removing an unnecessary portion of the raw metal plate, with the thin peripheral wall part being left. The entirety or a part of the thin peripheral wall part may be used for manufacturing a gasket-constituting plate. When the raw metal plate is extruded by the extrusion tool, the raw metal plate may be firmly held by the holding tool to prevent relative movement of the raw metal plate and the holding tool at a portion where the raw metal plate is held by the holding tool. Alternatively, the raw metal plate may be held by the holding tool so that the raw metal plate and the holding tool are relatively movable. When a gasket-constituting plate is manufactured by using an NC machine, a raw metal plate may be held by a pair of holding tools to prevent movement of the raw metal plate relative to and between the holding tools as in the former case. Alternatively, the raw metal plate may be held so as to allow the relative movement as in the latter case. When a gasket-constituting plate is manufactured by using a drawing machine, a raw metal plate is held by a die and a blank holder as holding tools so that the raw metal plate is relatively movable between the die and the blank holder, as in the latter case.

In this manufacturing method, through the part-to-project facing the extrusion hole is extruded in the thickness direction, while the raw metal plate of the gasket-constituting plate is held by the holding tool having the extrusion hole. Under such a simple work, a tensile force is caused to act on the peripheral wall part of the projecting part formed through extrusion to elongate the peripheral wall part, whereby a thin peripheral wall part thinner than the raw metal plate is formed at the peripheral wall part. Thus, the thin part is formed by elongating the raw metal plate with the tensile force being caused to act thereon. Accordingly, the thin part can be formed efficiently and precisely while adopting inexpensive facilities, as compared to the case where the thin part is formed through pressing, etching, cutting, etc.

(3) The method for manufacturing a gasket-constituting plate according to the above (2) further includes folding back the thin peripheral wall part to form a folded-back part. In this case, a gasket-constituting plate having a folded-back part thinner than the general part can be manufactured.

(4) The method for manufacturing a gasket-constituting plate according to the above (2) further includes folding back the thin peripheral wall part around a midway portion, of the thin peripheral wall part, in a radial direction between an inner peripheral edge and an outer peripheral edge of the thin peripheral wall part, to form a folded-back part. In this case, a gasket-constituting plate, in which a portion where the folded-back part is superposed on a folded-back part of a main body is made thin, can be manufactured, whereby the total thickness of the gasket-constituting plate at the folded-back parts can be easily adjusted to be large.

(5) The method for manufacturing a gasket-constituting plate according to the above (2) further includes machining the thin peripheral wall part into a plate-shaped thin flat part.

In this case, for example, in a gasket including a plurality of gasket-constituting plates disposed in a layered state, a portion of a second gasket-constituting plate, which corresponds to a folded-back part of a first gasket-constituting plate can be made thin.

(6) The method for manufacturing a gasket-constituting plate according to any one of the above (2) to (5), in which in the step (a), an amount of elongation per unit length of the thin peripheral wall part upon the raw metal plate being extruded in the thickness direction is set to different values according to portions, in a circumferential direction, of the thin peripheral wall part. In this case, as the amount of elongation per unit length of the thin peripheral wall part increases, the thin peripheral wall part becomes thinner. This enables adjustment of the thickness of the thin peripheral wall part to different values according to portions thereof in the circumferential direction.

(7) The method for manufacturing a gasket-constituting plate according to the above (6), in which the raw metal plate is provided with one or a plurality of through-holes at a portion corresponding to the part-to-project, each of the through-holes having a center on a circumference concentric to the part-to-project, and an amount of elongation due to the elongating is set to different values according to portions, in the circumferential direction, of the thin peripheral wall part. In this case, with the simple configuration of forming one or a plurality of through-holes in the raw metal plate, the amount of elongation per unit length of the thin peripheral wall part is adjusted when the raw metal plate is extruded in the thickness direction, whereby the thickness of the thin part can be adjusted according to portions, in the circumferential direction, of the thin part. Specifically, the amount of elongation per unit length of the metal portion of the thin peripheral wall part is reduced at a position where the through-hole is formed, whereby reduction in the thickness is suppressed.

(8) The method for manufacturing a gasket-constituting plate according to the above (6) or (7), in which in the step (a), the extrusion tool is used in which a distance between a center of the extrusion tool and an outer edge of a contact surface of the extrusion tool to the raw metal plate is set to different values according to portions, in a circumferential direction, of the extrusion tool, and the amount of the elongation is set to different values according to the portions, in the circumferential direction, of the thin peripheral wall part. In this case, with the simple configuration of adjusting the shape of the outer edge of the contact surface of the extrusion tool, the amount of elongation per unit length of the thin peripheral wall part is adjusted, whereby the thickness of the thin part can be adjusted according to portions, in the circumferential direction, of the thin part. Specifically, as the distance between the center of the extrusion tool and the outer edge of the contact surface with the raw metal plate in the extrusion tool increases, the amount of elongation per unit length of the metal portion of the thin peripheral wall part is reduced, whereby reduction in the thickness is suppressed.

The method for manufacturing a gasket-constituting plate according to any one of the above (6) to (8), in which the gasket-constituting plate is a component of a head gasket interposed between a cylinder block and a cylinder head of an engine, the gasket-constituting plate is provided with one or a plurality of combustion chamber holes, and a plurality of head bolt insertion holes into which head bolts for fixing the cylinder head are inserted, the thin part is provided around at least one combustion chamber hole among the one or a plurality of combustion chamber holes, and the amount of the elongation is set to be larger in a proximate portion to a head bolt insertion hole corresponding to the at least one combustion chamber hole than in a distant portion from the head bolt insertion hole. In the head gasket of the engine, the surface pressure that acts on the head gasket tends to increase as approaching the head bolt. In the present invention, of the thin part formed at the periphery of the combustion chamber, the amount of elongation is set to be larger in the proximate portion to the head bolt than in the distant portion from the head bolt, whereby the proximate portion is formed to be thinner than the distant portion. Thus, the surface pressure around the combustion chamber can be adjusted to be uniform.

(10) The method for manufacturing a gasket-constituting plate according to any one of the above (2) to (8), in which the gasket-constituting plate is a component of a head gasket interposed between a cylinder block and a cylinder head of an engine, the gasket-constituting plate is provided with one or a plurality of combustion chamber holes, a plurality of head bolt insertion holes into which head bolts for fixing the cylinder head are inserted, and a cooling water hole which allows cooling water to pass therethrough, and the thin part is provided around at least one hole among the one or a plurality of combustion chamber holes, the plurality of head bolt insertion holes, and the cooling water hole. In this case, the surface pressure around the combustion chamber hole or the head bolt insertion hole is appropriately adjusted to improve sealing performance of the engine.

Advantageous Effects of the Invention

The aforementioned method for manufacturing a gasket-constituting plate according to the present invention realizes efficient and precise manufacturing of a gasket-constituting plate, using inexpensive facilities. The gasket-constituting plate includes a thin part which is formed thinner than a general part other than the thin part, at a specific portion such as the periphery of an opening formed in the gasket-constituting plate, or an outer peripheral portion of the gasket-constituting plate. For example, the specific portion includes: the periphery of an opening of a combustion chamber hole, a head bolt insertion hole, or a cooling water hole, in a head gasket of an engine; an outer peripheral portion of a gasket-constituting plate disposed between a combustion chamber and a water jacket; and the like.

DESCRIPTION OF THE PREFERRED EMBODIMENTS

Hereinafter, an embodiment of the present invention will be described with reference to the drawings.

First, a head gasket, for a multi-cylinder engine, having a gasket-constituting plate manufacturable by a manufacturing method according to the present invention will be described.

Figure 1:
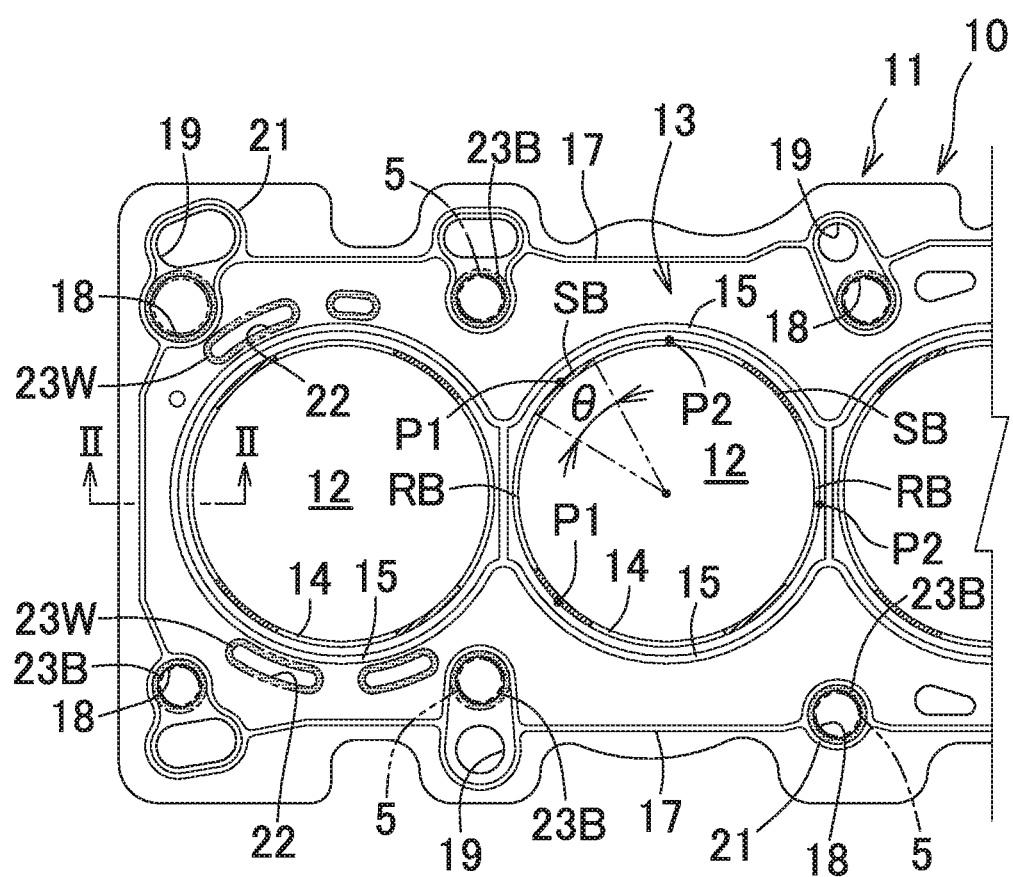
FIG. 1 is a plan view showing a major part of a single-plate metal gasket using a gasket-constituting plate manufactured by a manufacturing method of the present invention.
Figure 2:
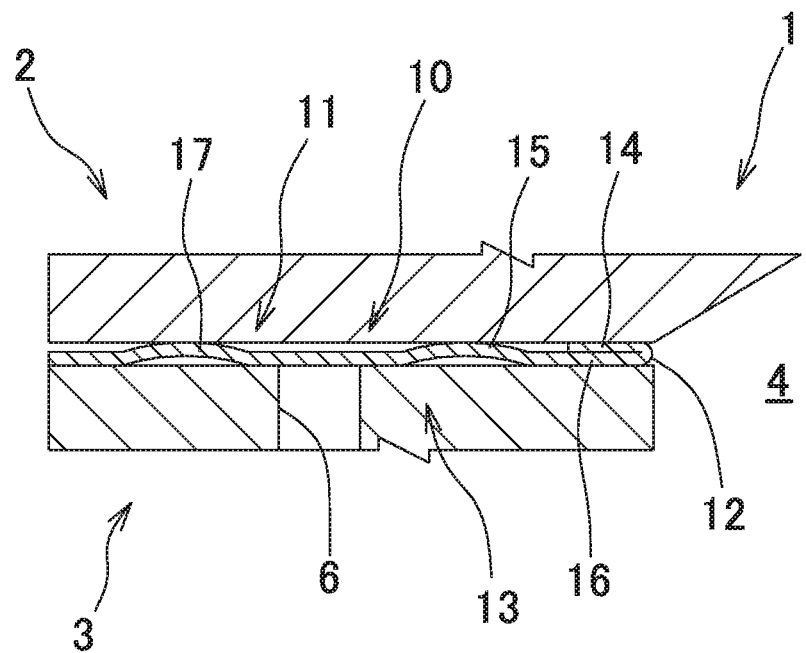
FIG. 2 is a cross-sectional view taken along a II-II line in FIG. 1, showing a state where the metal gasket is mounted to an engine.
Figure 3:
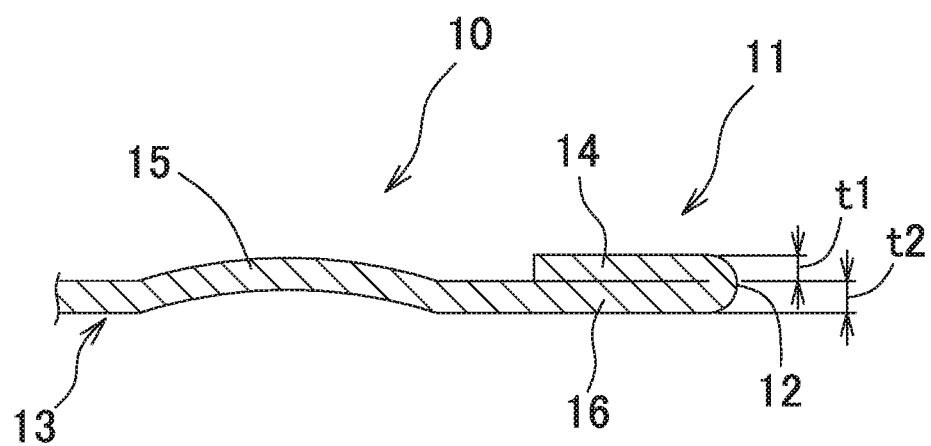
FIG. 3 is a cross-sectional view of the metal gasket, taken along the II-II line in FIG. 1.

As shown in FIGS. 1 to 3, a head gasket 10 is interposed between a cylinder head 2 and a cylinder block 3 of an engine 1. The head gasket 10 is used for sealing a combustion chamber 4, head fastening bolts 5, oil holes, gas holes, and a cooling water passage including a water jacket 6. The head gasket 10 is held between the cylinder head 2 and the cylinder block 3 by fixing the cylinder head 2 to the cylinder block 3 with a plurality of head fastening bolts 5.

As shown in FIGS. 1 to 3, the head gasket 10 is formed of a single gasket-constituting plate 11 made of metal. The gasket-constituting plate 11 includes: a substantially flat main body 13 having, as openings, a plurality of combustion chamber holes 12 arranged in series; and folded-back parts 14 each obtained by folding back an inner peripheral edge of the main body 13 on the combustion chamber hole 12 side, and superposing the folded-back edge part on the main body 13.

The main body 13 is provided with combustion chamber beads 15, and each combustion chamber bead 15 is an annular round bead which surrounds the corresponding folded-back part 14 to seal combustion gas. On the inner side of the combustion chamber bead 15, the main body 13 has a superposition part 16 on which the folded-back part 14 is superposed. An outer peripheral bead 17, which is a round bead for sealing cooling water, is annularly disposed near an outer edge of the main body 13. In midway portions of the outer peripheral bead 17, hole beads 21, each surrounding a head bolt insertion hole 18, and an oil hole 19 which permit passing of lubricating oil, etc., are disposed. Between the combustion chamber bead 15 and the outer peripheral bead 17, cooling water holes 22, which permit passing of cooling water, are formed penetrating through the main body 13. The outer peripheral bead 17 and the hole beads 21 may be configured as independent beads. In this case, the outer peripheral bead 17 and the hole beads 21 may be configured as round beads or step beads.

A thickness t1 of the folded-back part 14 as a thin part is less than a thickness t2 of a general part other than the thin part. A gap between the cylinder block 3 and the cylinder head 2 at a position corresponding to the combustion chamber bead 15 is appropriately adjusted by the folded-back part 14, whereby the surface pressure of the combustion chamber bead 15 against the cylinder block 3 and the cylinder head 2 is adjusted to improve sealing performance. The "general part" means a part, of the gasket-constituting plate 11, in which the thickness of a raw metal plate 50 of the gasket-constituting plate 11 is substantially maintained without change even after having been machined into the gasket-constituting plate 11.

Next, head gaskets of other configurations, which are manufacturable by the manufacturing method according to the present invention, will be described. The same components as those of the head gasket 10 are denoted by the same reference numerals, and the detailed description thereof will be omitted.

Figure 4A:
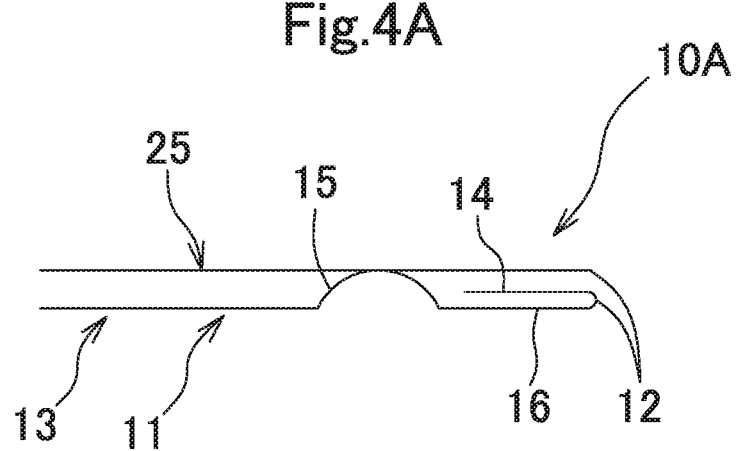
FIG. 4A is a longitudinal cross-sectional view showing a part, near a combustion chamber hole, of a multi-plate metal gasket using the gasket-constituting plate.
Figure 4B:
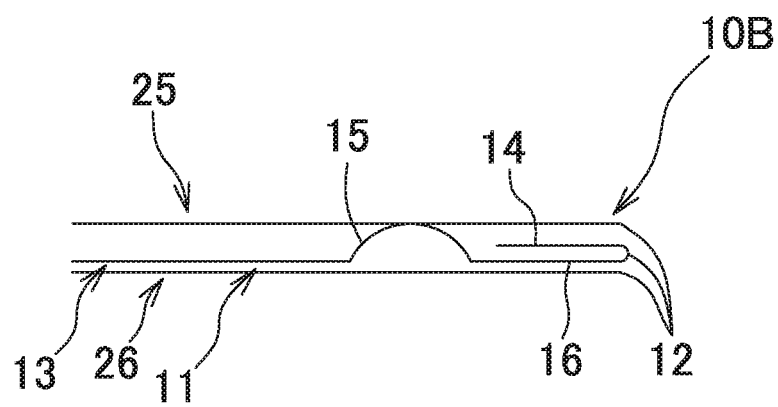
FIG. 4B is a longitudinal cross-sectional view showing a part, near a combustion chamber hole, of another multi-plate metal gasket using the gasket-constituting plate.

(1) A multi-plate head gasket can be formed by superposing one or a plurality of gasket-constituting plates having different functions, in a layered state, on the aforementioned gasket-constituting plate 11. For example, in a head gasket 10A shown in FIG. 4A, a substantially flat gasket-constituting plate 25 is disposed in a layered state on the upper side of the gasket-constituting plate 11. Alternatively, in a head gasket 10B shown in FIG. 4B, substantially flat gasket-constituting plates 25 and 26 are disposed in a layered state on the upper and lower sides of the gasket-constituting plate 11, respectively.

Figure 4C:
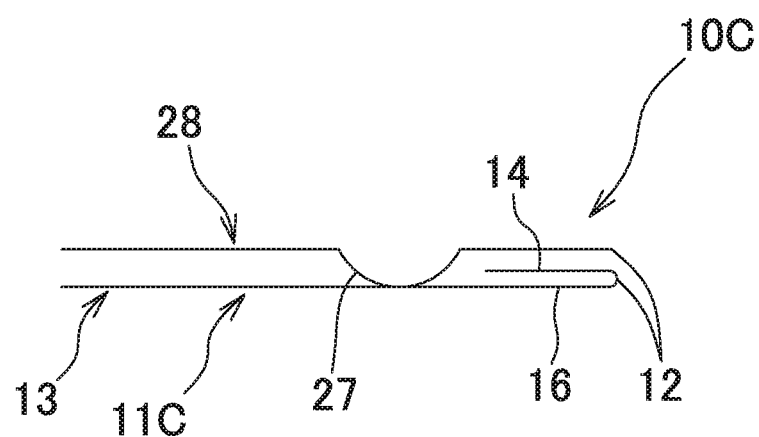
FIG. 4C is a longitudinal cross-sectional view showing a part, near a combustion chamber hole, of a multi-plate metal gasket using a gasket-constituting plate of another configuration, manufactured by the manufacturing method of the present invention.

(2) In a head gasket 10C shown in FIG. 4C, a gasket-constituting plate 11C, which is obtained by omitting the combustion chamber bead 15 from the gasket-constituting plate 11, and a gasket-constituting plate 28, which has a combustion chamber bead 27 at a position where the combustion chamber bead 15 is omitted, can be superposed in a layered state. Alternatively, one or a plurality of gasket-constituting plates having different functions may be further superposed on the gasket-constituting plate 11, 11C in a layered state, whereby a head gasket having a multi-plate structure including three or more plates can be formed.

Figure 5:
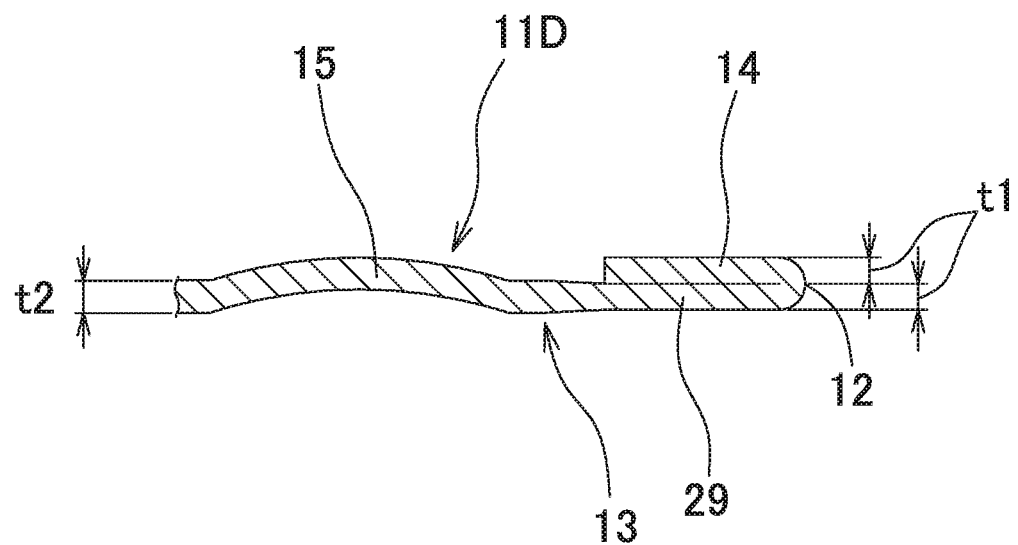
FIG. 5 is a longitudinal cross-sectional view showing a part, near a combustion chamber hole, of a gasket-constituting plate of another configuration, manufactured by the manufacturing method of the present invention.

(3) In a gasket-constituting plate 11D shown in FIG. 5, a superposition part 29 having the thickness t1 less than the thickness t2 of the general part can be disposed, instead of the aforementioned superposition part 16 on which the folded-back part 14 is superposed. A single-plate head gasket may be formed by using only the gasket-constituting plate 11D. Alternatively, one or a plurality of gasket-constituting plates may be further superposed on the gasket-constituting plate 11D in a layered state, whereby a multi-plate head gasket can also be formed.

Figure 6:
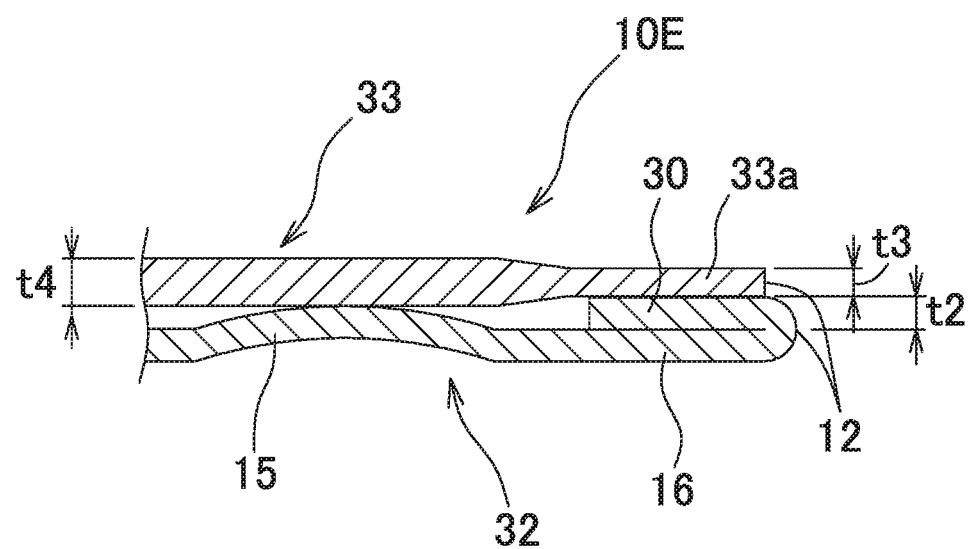
FIG. 6 is a longitudinal cross-sectional view showing a part, near a combustion chamber hole, of a multi-plate metal gasket using a gasket-constituting plate of another configuration, manufactured by the manufacturing method of the present invention.

(4) In a head gasket 10E shown in FIG. 6, a gasket-constituting plate 32 that has a folded-back part 30 having the same thickness t2 as the general part instead of the aforementioned folded-back part 14, and a gasket-constituting plate 33 that has a thin flat part 33a having a thickness t3 less than a thickness t4 of the general part at a position opposed to the folded-back part 30, are disposed in a layered state, and the surface pressure can be adjusted by the thin flat part 33a. A single or a plurality of gasket-constituting plates having different functions may be further superposed in a layered state on the gasket-constituting plates 32, 33 to obtain a multi-plate head gasket including three or more plates. Alternatively, instead of the gasket-constituting plate 32, the gasket-constituting plate 11 or the gasket-constituting plate 11D may be superposed in a layered state on the gasket-constituting plate 33.

Figure 7:
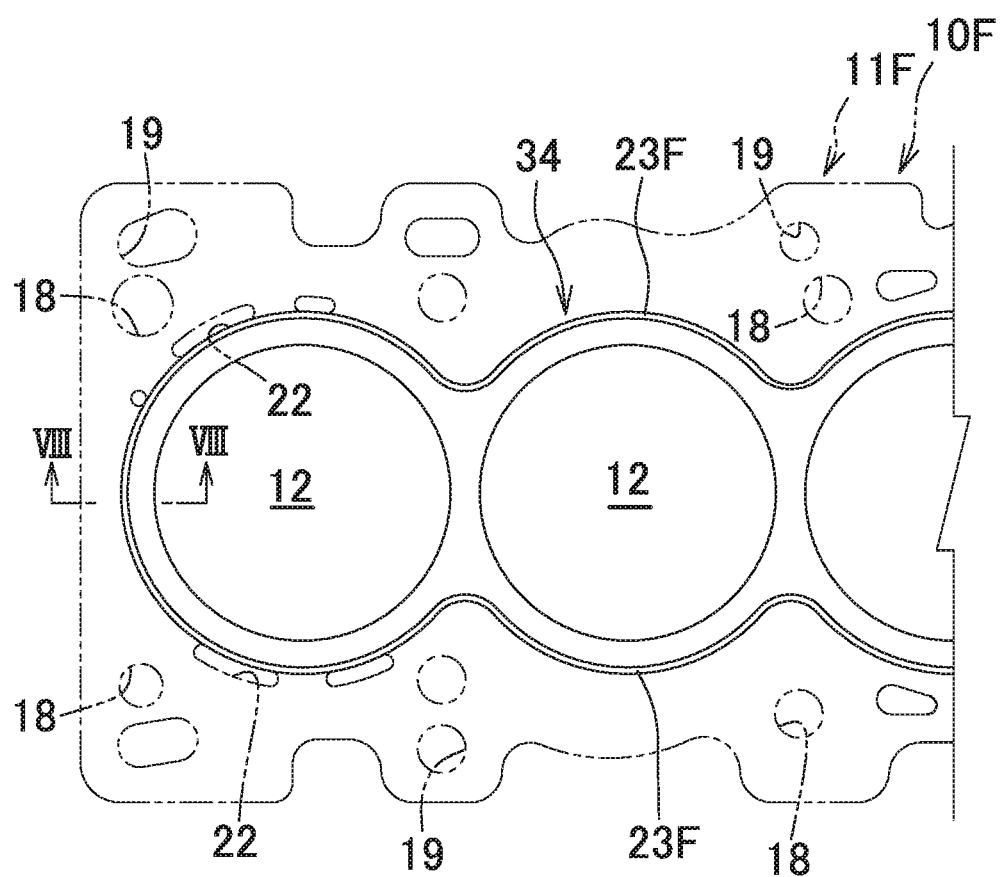
FIG. 7 is a plan view showing a major part of a gasket-constituting plate of another configuration, manufactured by the manufacturing method of the present invention.
Figure 8:
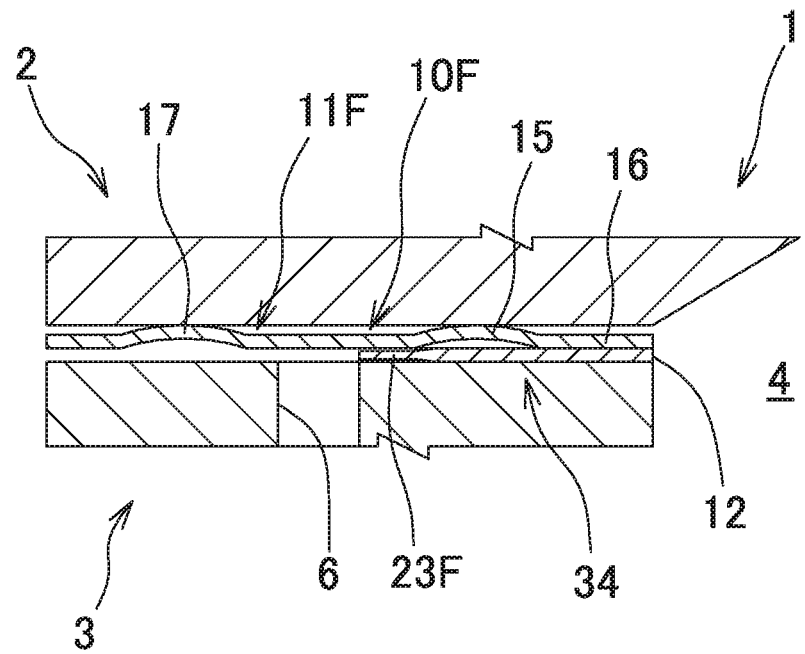
FIG. 8 is a cross-sectional view taken along a VIII-VIII line in FIG. 7, showing a state where a metal gasket using the gasket-constituting plate is mounted to an engine.

(5) A metal gasket 10F shown in FIGS. 7 and 8 includes a gasket-constituting plate 11F obtained by omitting the folded-back part 14 from the aforementioned gasket-constituting plate 11, and a gasket-constituting plate 34 which is disposed between the combustion chamber 4 and the water jacket 6 and is layered with the gasket-constituting plate 11F. At an outer peripheral portion of the gasket-constituting plate 34 disposed along the inner edge of the water jacket 6, a thin flat part 23F, which is thinner than the thickness of an inner peripheral portion of the gasket-constituting plate 34, can be disposed.

Figure 9:
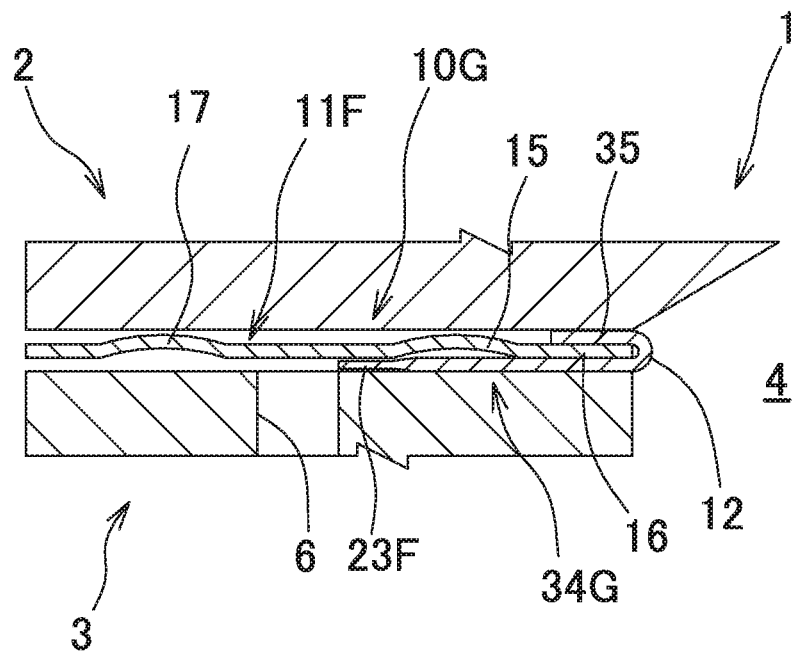
FIG. 9 is a diagram corresponding to FIG. 8 in a state where a metal gasket using a gasket-constituting plate of another configuration is mounted to an engine.

In a metal gasket 10G shown in FIG. 9, the gasket-constituting plate 11F of the aforementioned metal gasket 10F and a gasket-constituting plate 34G can be disposed in a layered state. The gasket-constituting plate 34G has, at an end of the aforementioned gasket-constituting plate 34 on the combustion chamber hole 12 side, a folded-back part 35 which is folded back so as to hold an inner peripheral portion of the gasket-constituting plate 11F on the combustion chamber hole 12 side.

(6) As shown in FIG. 1, the folded-back part 14 may be divided into proximate portions SB (shown by hatching in FIG. 1) to the head bolt insertion holes 18 and distant portions RB from the head bolt insertion holes 18, and the proximate portions SB of folded-back part 14 may be made thinner than the distant portions RB thereof. A central angle θ of an arc of each proximate portion SB is set to an angle within a predetermined range, e.g., 15° to 30°, around a position P1 closest to the head bolt insertion hole 18 in the folded-back part 14. However, the thickness of at least one of the proximate portion SB and the distant portion RB may be adjusted stepwise or continuously as approaching the closest position P1. When this configuration is applied to the gasket-constituting plate 11D shown in FIG. 5, the thicknesses of the folded-back part 14 and the superposition part 29 corresponding to the proximate portions SB are made less than the thicknesses thereof corresponding to the distant portions RB with respect to the head bolt insertion holes 18. When the above configuration is applied to the gasket-constituting plate 33 shown in FIG. 6, the thickness of the thin flat part 33a corresponding to the proximate portions SB is made less than the thickness thereof corresponding to the distant portions RB with respect to the head bolt insertion holes 18. When the above configuration is applied to the gasket-constituting plates 34 and 34G shown in FIGS. 8 and 9, respectively, the thickness of the thin flat part 23F corresponding to the proximate portions SB is made less than the thickness of the distant portions RB with respect to the head bolt insertion holes 18.

(7) As shown by dotted lines in FIG. 1, a thin part 23B, having a reduced thickness, may be formed over the periphery of each head bolt insertion hole 18, or a thin part 23W, having a reduced thickness, may be formed over the periphery of each cooling water hole 22. The thin part 23B may be formed at the peripheries of all the head bolt insertion holes 18, or may be formed at the peripheries of specific head bolt insertion holes 18. The thin part 23W may be formed, like the thin part 23B, at the peripheries of all the cooling water holes 22, or may be formed at the peripheries of specific cooling water holes 22. Furthermore, like the folded-back part 14, the thin part 23B, 23W may be formed so as to vary in thickness according to portions thereof in the circumferential direction, taking into consideration, for example, the surface pressure at the periphery of the combustion chamber hole 12. For example, of the thin part 23B and the thin part 23W, portions disposed within a region inside two tangential lines drawn from the center of the combustion chamber hole 12 toward each head bolt insertion hole 18, may be made thinner than other portions.

However, as for a head gasket manufacturable by the manufacturing method of the present invention, as long as the head gasket includes at least one gasket-constituting plate having thin parts, any configuration may be adopted for components other than the gasket-constituting plate. As for a gasket-constituting plate having thin parts, any configuration may be adopted for components other than the thin parts. Furthermore, the configurations described in above (1) to (7) may be combined as desired to obtain a metal gasket.

(Manufacturing Method)

Next, a method for manufacturing the gasket-constituting plate 11 will be described.

Figure 10A:
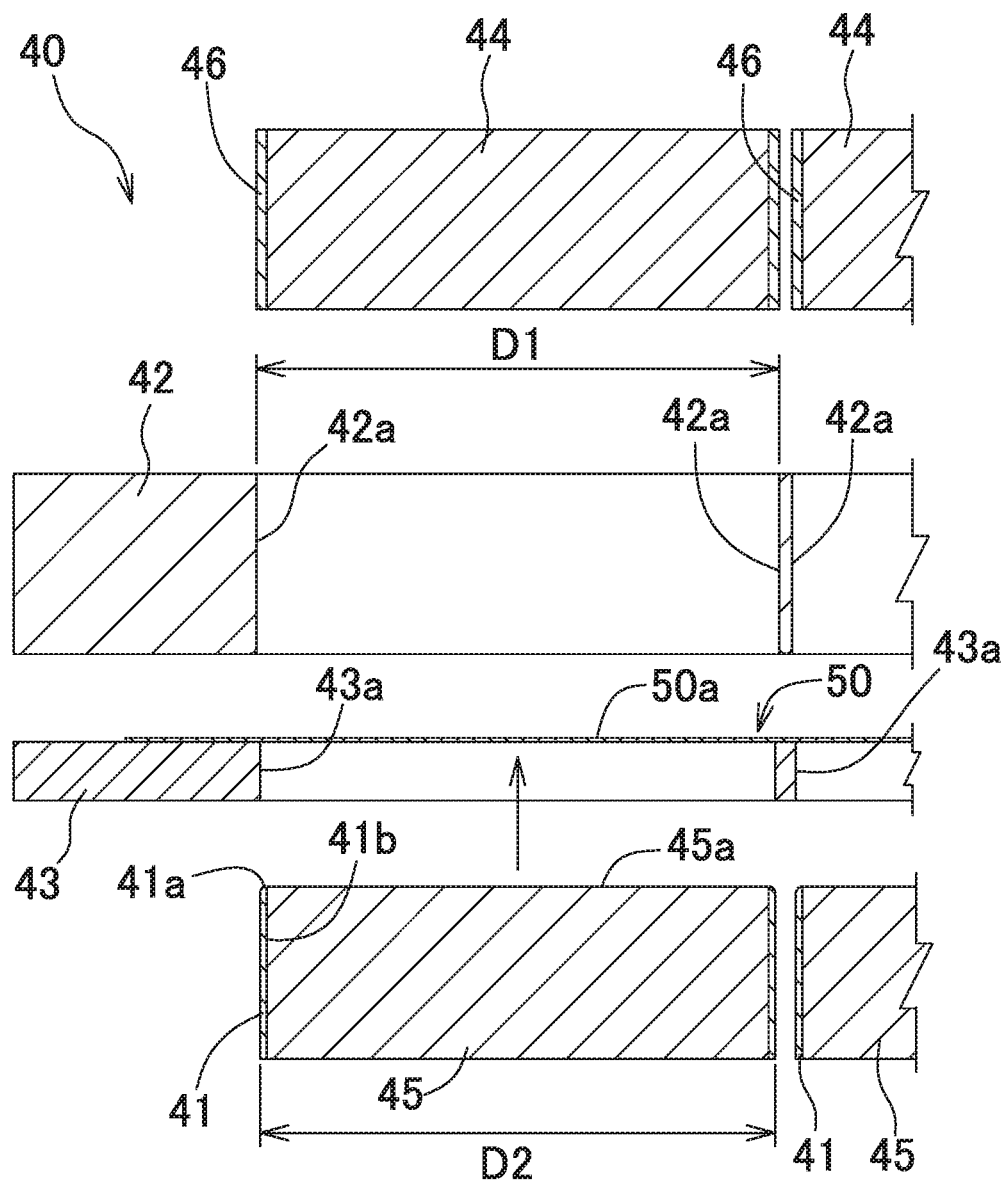
FIG. 10A is a longitudinal cross-sectional view showing a major part of a machining device immediately before extrusion of a raw metal plate, in the manufacturing method of the present invention.

First, a machining device 40 for machining the gasket-constituting plate 11 will be described. As shown in FIG. 10A, the machining device 40 is composed of a blanking/drawing machine including: a drawing punch 41 as an extrusion tool; a drawing die 42 and a blank holder 43 as holding tools; a blanking punch 44; and knockouts 45 and 46. The drawing punch 41 is provided so as to correspond to a combustion chamber hole 12. In the drawing die 42 and the blank holder 43, extrusion holes 42a and 43a, which permit insertion of the drawing punch 41, are formed so as to correspond to the combustion chamber hole 12. A bore D1 of the extrusion hole 42a of the drawing die 42 is set to a dimension conformable to an inner edge, of the folded-back part 14, which is a boundary between the thin part and the general part of the gasket-constituting plate 11 (in the gasket-constituting plate 11, the boundary between the folded-back part 14 as the thin part and the general part other than the thin part). The bore D1 of the extrusion hole 42a and an outer diameter D2 of the drawing punch 41 may be set to any dimension as long as, when the drawing punch 41 is concentrically inserted into the extrusion hole 42a, the dimensions allow a gap at least equal to or greater than the thickness of the raw metal plate 50 to be formed over the entire periphery between the drawing punch 41 and the extrusion hole 42a.

The drawing punch 41 has a through-hole 41b, and the knockout 45 is internally fitted in the through-hole 41b so as to be vertically movable. The cylindrical knockout 46 is externally fitted to the blanking punch 44 so as to be vertically movable. The knockout 46 is internally fittable to the extrusion hole 42a. The blanking punch 44 is internally fittable to the through-hole 41b substantially without a gap.

When the gasket-constituting plate 11 is formed by using the machining device 40, first, as shown in FIG. 10A, a flat raw metal plate 50, such as a stainless steel plate, having the same thickness t2 as the general part of the gasket-constituting plate 11 is set on the blank holder 43 of the machining device 40, and the raw metal plate 50 is held between the drawing die 42 and the blank holder 43.

Figure 10B:
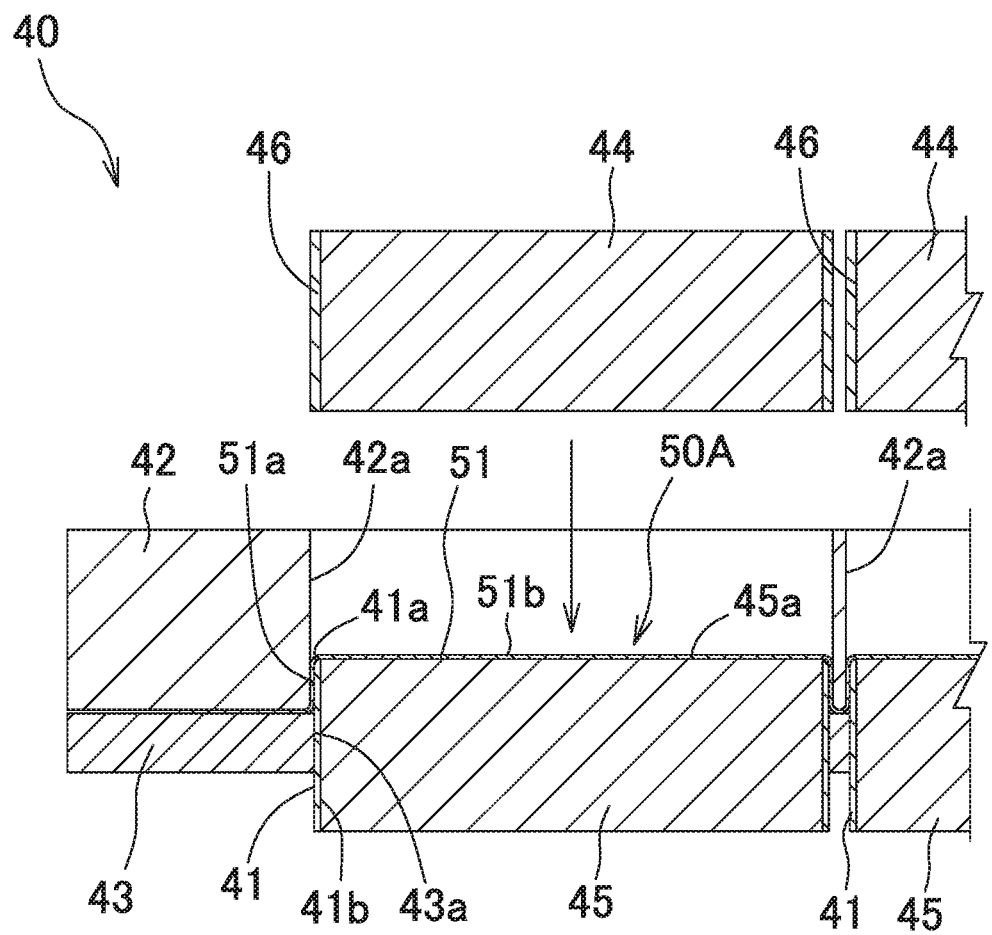
FIG. 10B is a longitudinal cross-sectional view showing the major part of the machining device immediately after extrusion of the raw metal plate, in the manufacturing method of the present invention.
Figure 10C:
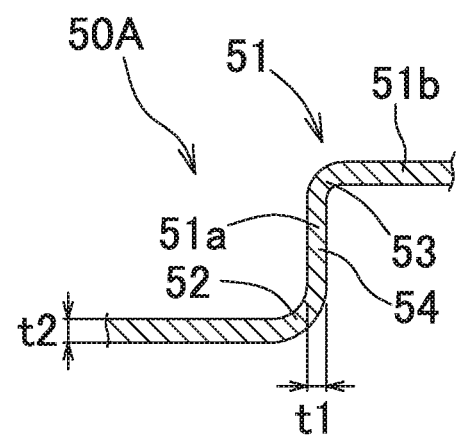
FIG. 10C is a longitudinal cross-sectional view showing a thin peripheral wall part of a primary machined workpiece and the vicinity thereof, in the manufacturing method of the present invention.

Next, as shown in FIG. 10B, the drawing punch 41 and the knockout 45 are inserted into the extrusion holes 42a and 43a of the drawing die 42 and the blank holder 43. Then, a part-to-project 50a of the raw metal plate 50 facing the extrusion hole 42a is projected to the inside of the extrusion hole 42a by the drawing punch 41, thereby manufacturing a primary machined workpiece 50A, shown in FIGS. 10B and 10C, having a cylindrical bottomed projecting part 51 at a position corresponding to the combustion chamber 4 of the raw metal plate 50. At this time, a portion of the raw metal plate 50 disposed between the drawing die 42 and the blank holder 43 is drawn into the extrusion hole 42a, while a tensile force is caused to act on the outer periphery of the projecting part 51 in the direction of extrusion of the drawing punch 41, whereby the raw metal plate 50 is elongated, and a thin peripheral wall part 51a, which is thinner than the raw metal plate 50, is formed. However, the thickness of the thin peripheral wall part 51a varies among a shoulder portion 52 formed by the drawing die 42, a shoulder portion 53 formed by the drawing punch 41, and a midway portion 54 disposed between the shoulder portions 52 and 53. At least the thickness of the midway portion 54 is less than the thicknesses of the shoulder portions 52 and 53. The raw metal plate 50 may be firmly held by the drawing die 42 and the blank holder 43 so as not to be drawn toward the extrusion hole 42a.

Figure 10D:
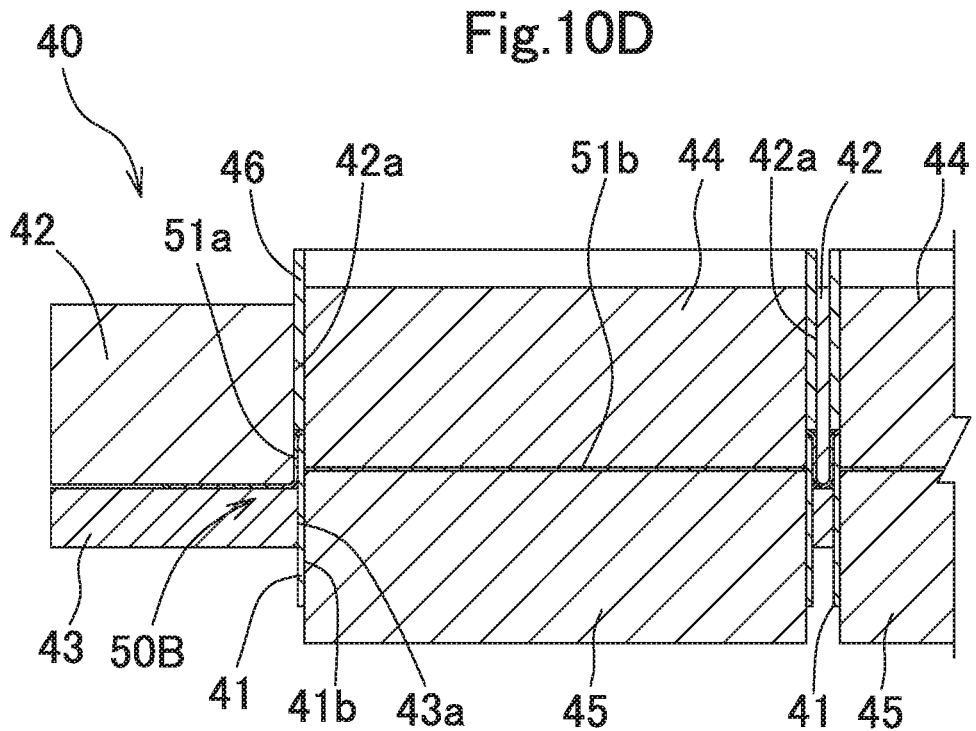
FIG. 10D is a longitudinal cross-sectional view showing the major part of the machining device in a state where a bottom portion of a projecting part is punched out, in the manufacturing method of the present invention.
Figure 10E:
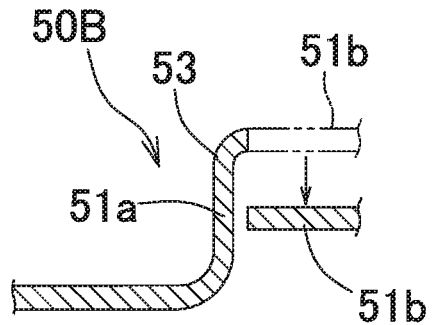
FIG. 10E is a longitudinal cross-sectional view showing a thin peripheral wall part of a secondary machined workpiece and the vicinity thereof, in which a bottom portion is removed, and the removed bottom portion, in the manufacturing method of the present invention.

Next, as shown in FIGS. 10D and 10E, with a bottom portion 51b of the projecting part 51 being held between the blanking punch 44 and the knockout 45, and the shoulder portion 53 being held between the drawing punch 41 and the knockout 46, the blanking punch 44 and the knockout 45 are moved downward relative to the drawing punch 41, thereby manufacturing a secondary machined workpiece 50B in which the bottom portion 51b of the projecting part 51 is punched out with the thin peripheral wall part 51a corresponding to the folded-back part 14 being left. However, punching-out of the bottom portion 51b from the primary machined workpiece 50A may be performed by using a separately provided punching device.

Figure 10F:
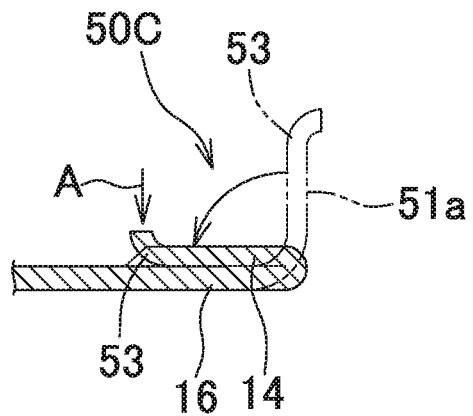
FIG. 10F is a longitudinal cross-sectional view showing a folded-back part of a tertiary machined workpiece, in the manufacturing method of the present invention.

Next, as shown in FIG. 10F, the thin peripheral wall part 51a of the secondary machined workpiece 50B is subjected to hemming, or in other words, is folded back at 90° around a base end part thereof. Next, as shown by an arrow A in FIG. 10F, the shoulder portion 53 is pressed and smashed through pressing, thereby manufacturing a tertiary machined workpiece 50C having the folded-back part 14 formed using the thin peripheral wall part 51a.

Next, in the tertiary machined workpiece 50C, the head bolt insertion holes 18, the oil holes 19, and the cooling water holes 22 are formed through punching, and the combustion chamber beads 15 and the outer peripheral beads 17 are formed through molding, thereby obtaining the gasket-constituting plate 11.

In the above manufacturing method, through the simple work of extruding the part-to-project 50a of the raw metal plate 50 facing the extrusion hole 42a, in the thickness direction of the raw metal plate 50, by using the drawing punch 41 while holding the raw metal plate 50 between the drawing die 42 and the blank holder 43, a tensile force is caused to act on the thin peripheral wall part 51a of the projecting part 51, so that the thin peripheral wall part 51a is made thinner than the raw metal plate 50, and the thin folded-back part 14 is formed by the thin peripheral wall part 51a. As mentioned above, the folded-back part 14 can be formed to be thin by elongating the raw metal plate 50 with the tensile force being caused to act thereon. Accordingly, the thin folded-back part 14 can be formed efficiently and precisely while adopting the machining device 40 such as a blanking/drawing machine which is inexpensively available, as compared to the case where the folded-back part 14 is made thin through pressing, etching, cutting, etc.

Next, methods for manufacturing a gasket-constituting plate 11 according to other embodiments will be described. The same components as those in the above embodiment are denoted by the same reference numerals, and the detailed description thereof will be omitted.

Figure 11A:
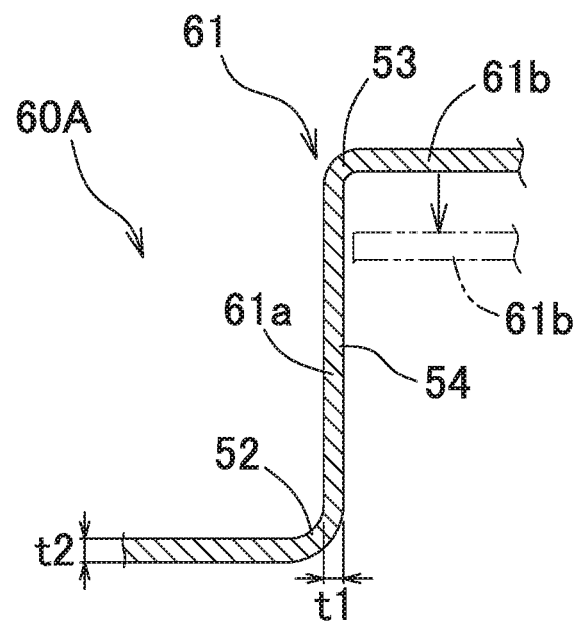
FIG. 11A is a longitudinal cross-sectional view showing a thin peripheral wall part of a primary machined workpiece and the vicinity thereof, in a manufacturing method according to another embodiment.
Figure 11B:
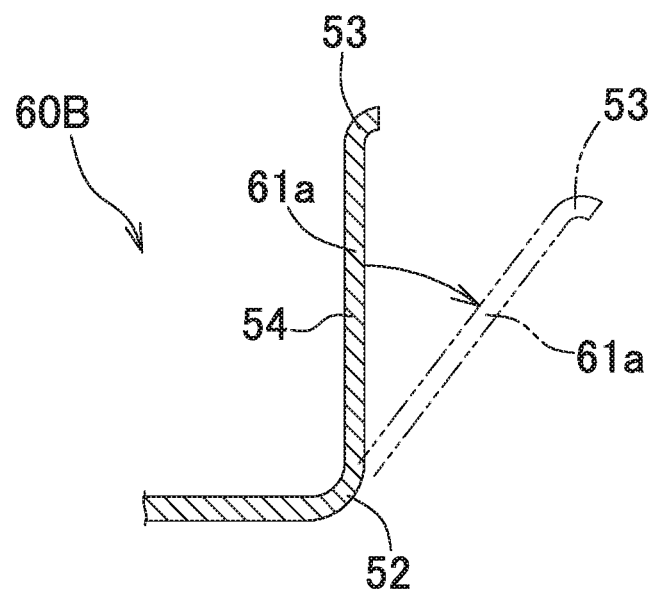
FIG. 11B is a longitudinal cross-sectional view showing a thin peripheral wall part of a secondary machined workpiece and the vicinity thereof, in the manufacturing method according to the other embodiment.
Figure 11C:
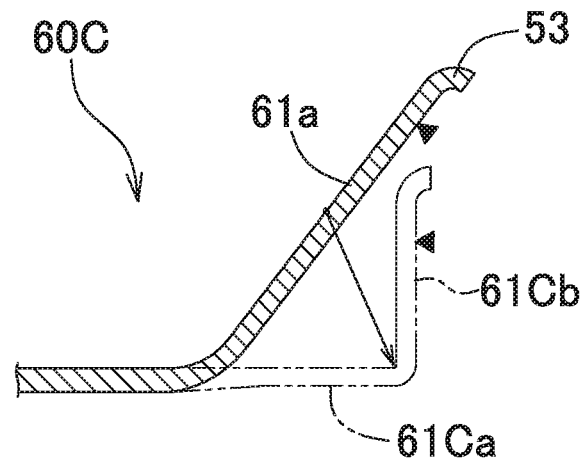
FIG. 11C is a longitudinal cross-sectional view showing a thin peripheral wall part of a tertiary machined workpiece and the vicinity thereof, in the manufacturing method according to the other embodiment.
Figure 11D:
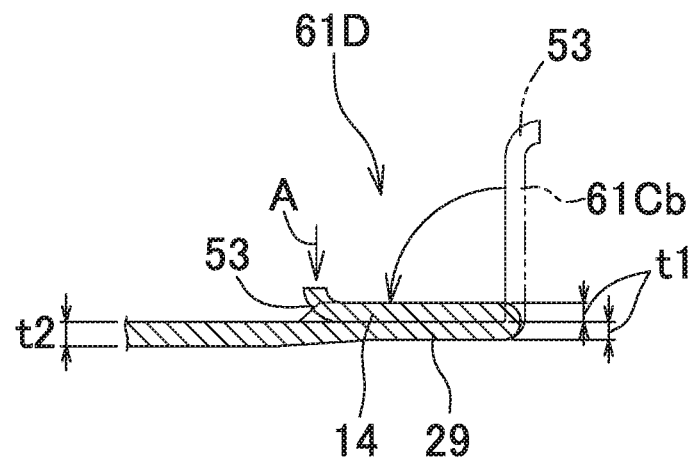
FIG. 11D is a longitudinal cross-sectional view showing a folded-back part of a quaternary machined workpiece and the vicinity thereof, in the manufacturing method according to the other embodiment.

(1) The gasket-constituting plate 11D shown in FIG. 5 is manufactured as follows. First, a primary machined workpiece 60A is manufactured by machining a raw metal plate 50 so as to have a projecting part 61 as shown in FIG. 11A by using a machining device having the same configuration as the machining device 40, except that the bore of the extrusion hole 42a is set to a dimension conformable to the boundary between the general part, and the folded-back part 14 and the superposition part 29 of the gasket-constituting plate 11D, or in other words, to the outer edge of the superposition part 29. Next, as shown in FIGS. 11A and 11B, a secondary machined workpiece 60B is manufactured in which a bottom portion 61b of the projecting part 61 is punched out with a thin peripheral wall part 61a corresponding to the folded-back part 14 and the superposition part 29 being left. Next, as shown in FIG. 11C, the thin peripheral wall part 61a is bent at about 45° around a base part thereof so that the erection angle of the thin peripheral wall part 61a of the secondary machined workpiece 60B is decreased, thereby manufacturing a tertiary machined workpiece 60C. Next, as shown in FIG. 11C, an outer peripheral portion 61Ca of the thin peripheral wall part 61a of the tertiary machined workpiece 60C is bent to be flat around a base part thereof, and an inner peripheral portion 61Cb of the thin peripheral wall part 61a is folded back at 90° around a base part thereof. Thereafter, as shown in FIG. 11D, the inner peripheral portion 61Cb is subjected to hemming, or in other words, is folded back at 90° around a base part thereof, whereby the inner peripheral portion 61Cb is bent and superposed on the outer peripheral portion 61Ca. Further, the shoulder portion 53 is pressed and smashed through pressing, thereby manufacturing a quaternary machined workpiece 60D in which the folded-back part 14 and the thin part 29 are formed by the inner peripheral portion 61Cb and the outer peripheral portion 61Ca of the thin peripheral wall part 61a. Next, in the quaternary machined workpiece 60D, the head bolt insertion holes 18, the oil holes 19, and the cooling water holes 22 are formed through punching, and the combustion chamber beads 15 and the outer peripheral beads 17 are formed through molding, thereby obtaining the gasket-constituting plate 11D.

Figure 12:
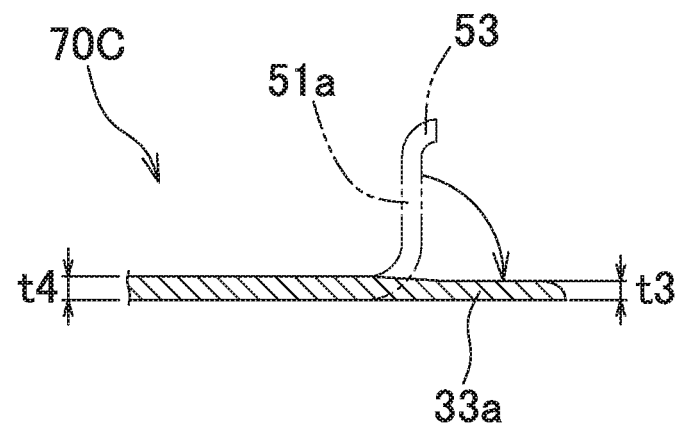
FIG. 12 is an enlarged longitudinal cross-sectional view showing a thin flat part and its vicinity of a secondary machined workpiece, in a manufacturing method according to another embodiment.

(2) The gasket-constituting plate 33 shown in FIG. 6 is manufactured as follows. The aforementioned secondary machined workpiece 50B is manufactured by using a raw metal plate having a thickness t4. As shown in FIG. 12, the thin peripheral wall part 51a of the secondary machined workpiece 50B is not folded back but is flattened through pressing to form a thin flat part 33a, thereby manufacturing a tertiary machined workpiece 70C. Then, in the tertiary machined workpiece 70C, the head bolt insertion holes 18, the oil holes 19, and the cooling water holes 22 are formed through punching, and the combustion chamber beads 15 and the outer peripheral beads 17 are formed through molding, thereby obtaining the gasket-constituting plate 33.

Figure 13A:
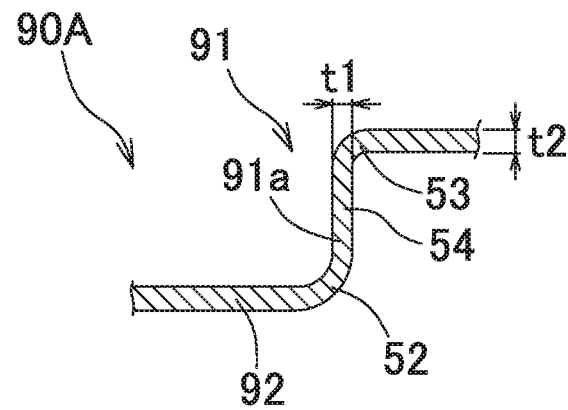
FIG. 13A is an enlarged longitudinal cross-sectional view showing a thin peripheral wall part of a primary machined workpiece and the vicinity thereof, in a manufacturing method according to another embodiment.
Figure 13B:
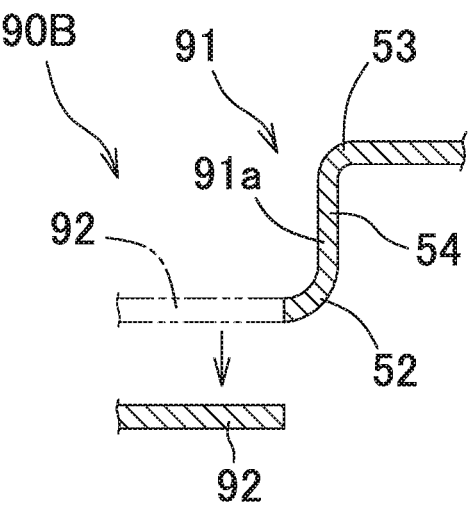
FIG. 13B is a longitudinal cross-sectional view showing a thin peripheral wall part of a secondary machined workpiece in which an outer peripheral portion is removed, and the vicinity thereof, as well as the removed outer peripheral portion, in the manufacturing method according to the other embodiment.
Figure 13C:
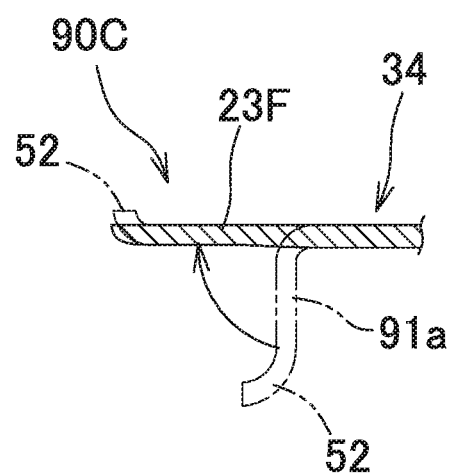
FIG. 13C is a longitudinal cross-sectional view showing a thin flat part of a tertiary machined workpiece and the vicinity thereof, in the manufacturing method according to the other embodiment.

(3) The gasket-constituting plate 34 shown in FIGS. 7 and 8 is manufactured as follows. First, as shown in FIG. 13A, a flat raw metal plate 50 is machined by using a blanking/drawing machine to manufacture a primary machined workpiece 90A having a projecting part 91 shaped so as to conform to the outer edge of the gasket-constituting plate 34. Next, as shown in FIG. 13B, an outer peripheral portion 92 of the primary machined workpiece 90A is removed through punching, with a thin peripheral wall part 91*a* of the projecting part 91 being left, thereby manufacturing a secondary machined workpiece 90B. Next, as shown in FIG. 13C, the thin peripheral wall part 91*a* is flattened through pressing, and a shoulder portion 52 formed by the drawing die is pressed and smashed to form a thin flat part 23F, thereby manufacturing a tertiary machined workpiece 90C. Next, the tertiary machined workpiece 90C is subjected to press work to form the combustion chamber holes 12 and the like, thereby obtaining the gasket-constituting plate 34 shown in FIGS. 7 and 8.

Figure 14:
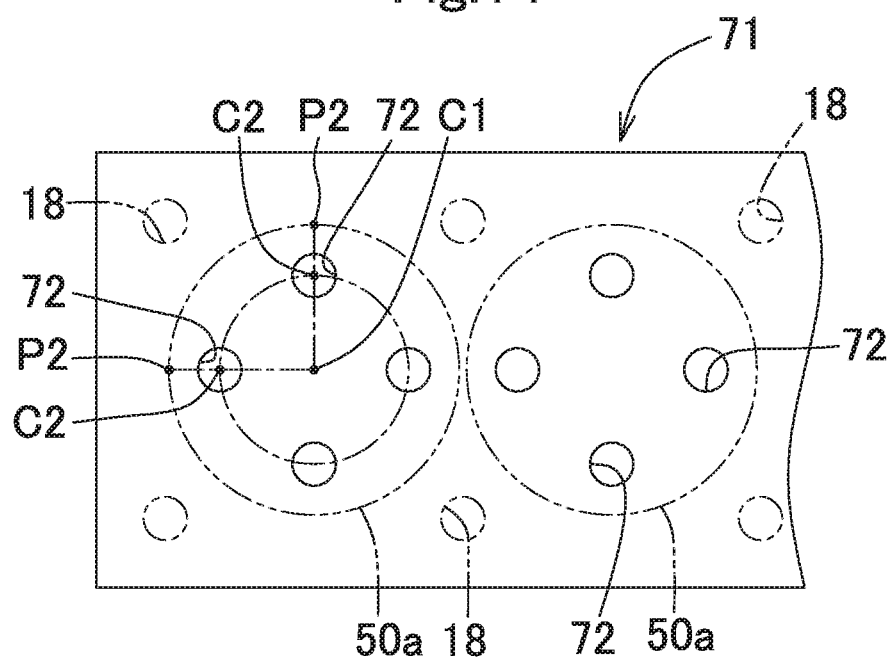
FIG. 14 is a plan view showing a raw metal plate in which the thickness of a thin part around an opening is adjustable according to portions in a circumferential direction.

(4) In a case where, as for the thickness of the folded-back part 14, the proximate portions SB thereof, with respect to the head bolt insertion holes 18, are made thinner than the distant portions RB thereof as shown by hatching in FIG. 1, the gasket-constituting plate 11 is manufactured by the same manufacturing method as that of the above embodiment, except that a raw metal plate 71 shown in FIG. 14 is used instead of the raw metal plate 50. In the raw metal plate 71, four through-holes 72 are formed in the part-to-project 50*a* such that each through-hole 72 has a center C2 on a circle concentric to the part-to-project 50*a* and on a line segment connecting a most-distant position P2 from the head bolt insertion hole 18 with a center C1 of the part-to-project 50*a*. In this case, when the projecting part 51 is formed in the raw metal plate 71 by the machining device 40, a sufficient tensile force is not caused to act on a portion, in the circumferential direction corresponding to the through-hole 72, of the thin peripheral wall part 51*a* of the projecting part 51 due to deformation of the through-hole 72, and therefore, the thickness of this portion is not sufficiently reduced, whereas a sufficient tensile force is caused to act on a portion, in the circumferential direction, away from the through-hole 72, and therefore, the thickness of this portion is sufficiently reduced. Thus, a region within a predetermined range around the closest position P1 to the head bolt insertion hole 18 is made thinner than other portions. The thickness of the folded-back part 14 is optionally adjustable by adjusting the diameter of the through-hole 72, the shape of the through-hole 72, the distance between the center C2 of the through-hole 72 and the center C1 of the part-to-project 50*a*, etc. As for the folded-back part 14 of the gasket-constituting plate 11D shown in FIG. 5 or the thin flat part 33*a* of the gasket-constituting plate 33 shown in FIG. 6, this portion can be machined such that the thickness thereof varies between the proximate portions SB and the distant portions RB through manufacturing using the raw metal plate 71.

Figure 15A:
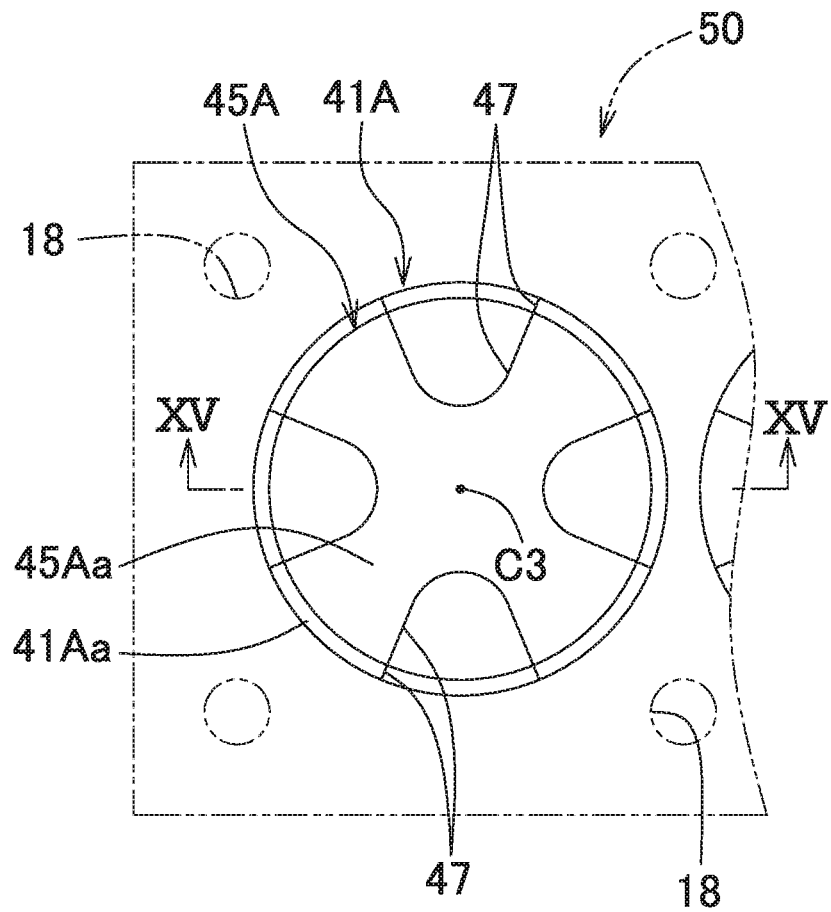
FIG. 15A is a plan view showing an extrusion tool according to another embodiment, which is able to adjust the thickness of a thin part around an opening according to portions in a circumferential direction.
Figure 15B:
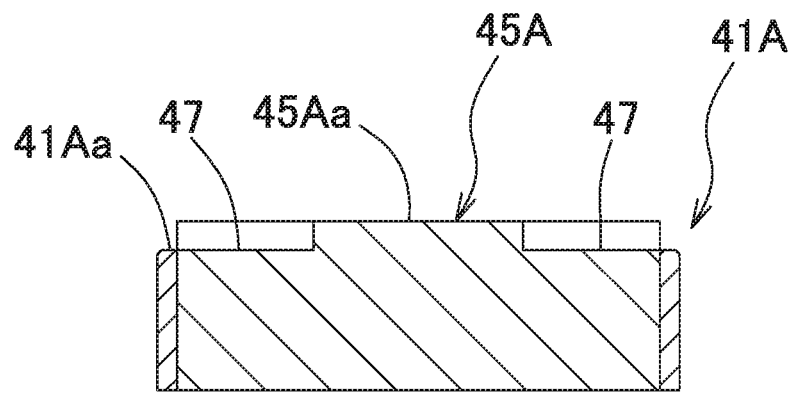
FIG. 15B is a cross-sectional view taken along a XV-XV line in FIG. 15A, for explaining the extrusion tool.

Adjustment of the thickness of the folded-back part 14 according to portions thereof in the circumferential direction can be performed by changing the shape of the contact surface of the extrusion tool to the raw metal plate 50, that is, the shape of a contact surface 41*a* of the drawing punch 41 to the raw metal plate 50, or by changing the shapes of contact surfaces 41*a* and 45*a* of the drawing punch 41 and the knockout 45 to the raw metal plate 50 when the drawing punch 41 and the knockout 45 are used as extrusion tools. Specifically, as in a drawing punch 41A and a knockout 45A shown in FIGS. 15A and 15B, a groove 47 is formed within a predetermined range around the most-distant position P2 from each head bolt insertion hole 18, on contact surface 41Aa, 45Aa to the raw metal plate 50, as a distance adjustment part for adjusting the distance from the center of the drawing punch 41A to the outer edge of the contact surface 41*a*, 45*a*. In this case, when the projecting part 51 is formed in the raw metal plate 50 by the machining device 40, an extension force per unit length is reduced in a portion, in the circumferential direction corresponding to the groove 47, of the thin peripheral wall part 51*a* of the projecting part 51, and therefore, the thickness of this portion is not sufficiently reduced, whereas an extension force per unit length is increased in a portion, in the circumferential direction, where no groove 47 is formed, and therefore, the thickness of this portion is reduced. Thus, a portion within a predetermined range around the closest position P1 to the head bolt insertion hole 18 is made thinner than other portions. The thickness of the folded-back part 14 is optionally adjustable by adjusting the circumferential length of the groove 47, the shape of the groove 47, the distance between the boundary of the groove 47 and the contact surface 41Aa (45Aa) and a center C3 of the drawing punch 41A (the knockout 45A), etc. As for the folded-back part 14 of the gasket-constituting plate 11D shown in FIG. 5 or the thin flat part 33*a* of the gasket-constituting plate 33 shown in FIG. 6, this portion can be machined such that the thickness thereof varies between the proximate portions SB and the distant portions RB through manufacturing using the drawing punch 41A and the knockout 45A. However, when punching of the bottom portion 51*b*, 61*b* is independently performed using a punching device different from the machining device 40, a drawing punch in which the drawing punch 41A and the knockout 45A are integrated is used in the machining device 40. In this case, as the distance adjustment part, a notch having the same planar shape as the groove 47 may be used instead of the groove 47.

Figure 16A:
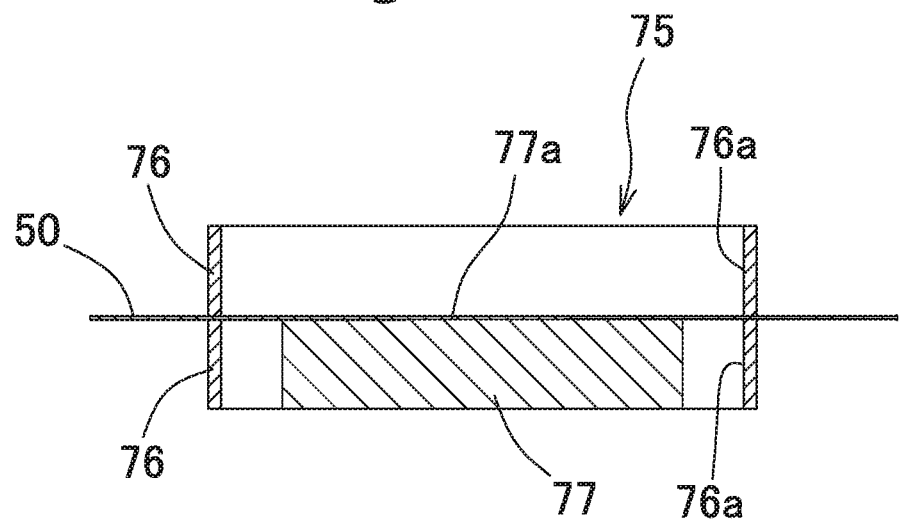
FIG. 16A is a longitudinal cross-sectional view showing a major part of a machining device immediately before extrusion of a raw metal plate, in a manufacturing method using a machining device of another configuration.
Figure 16B:
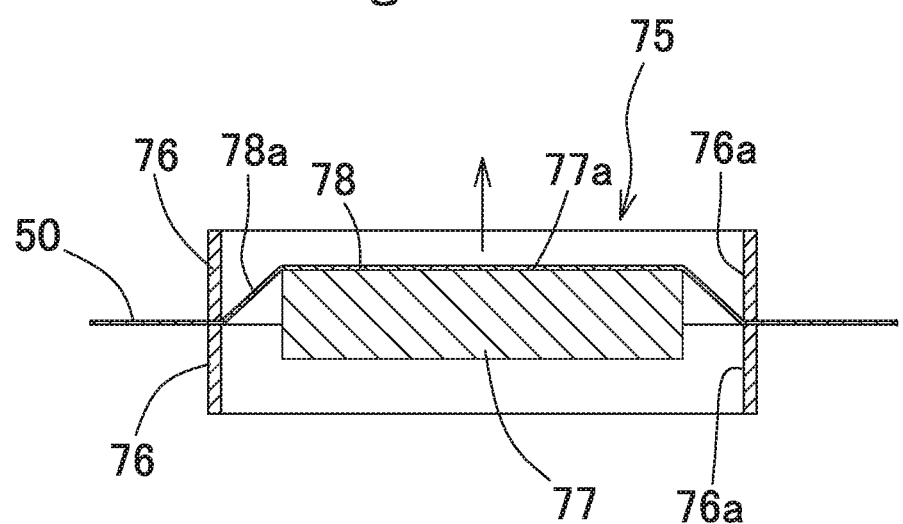
FIG. 16B is a longitudinal cross-sectional view showing the major part of the machining device immediately after extrusion of the raw metal plate, in the manufacturing method using the machining device.

(5) The gasket-constituting plate 11 may be manufactured by using an NC machine 75 instead of a drawing machine as the machining device 40. For example, as shown in FIG. 16A, the NC machine 75 is provided with a pair of cylindrical holding tools 76, and a cylindrical extrusion tool 77 which can be inserted in an extrusion hole 76*a* of the holding tools 76. As shown in FIG. 16B, with a raw metal plate 50 being held by the holding tools 76 without slippage, the extrusion tool 77 is inserted in the extrusion hole 76*a* of the holding tools 76 to form a projecting part 78 in the raw metal plate 50. In FIGS. 16A and 16B, one projecting part 78 is formed in the raw metal plate 50. However, a plurality of extrusion holes 76*a* may be formed in the holding tools 76 so as to correspond to the combustion chamber holes 12, and a plurality of projecting parts 78 may be simultaneously machined by the plurality of extrusion tools 77. Although the projecting part 78 is machined into a hollow truncated conical shape with the thin peripheral wall part 78*a* being inclined, the projecting part 78 may be machined into a bottomed cylindrical shape, like the projecting part 51. Furthermore, as in the above (3), when the raw metal plate 71 is used or when the contact surface 77*a* of the extrusion tool 77 to the raw metal plate 50 is configured similarly to the drawing punch 41A, it is possible to machine the folded-back part 14 of the gasket-constituting plate 11, the folded-back part 14 of the gasket-constituting plate 11D shown in FIG. 5, or the thin flat part 33*a* of the gasket-constituting plate 33 shown in FIG. 6 such that the thickness thereof varies between the proximate portions SB and the distant portions RB.

Figure 17A:
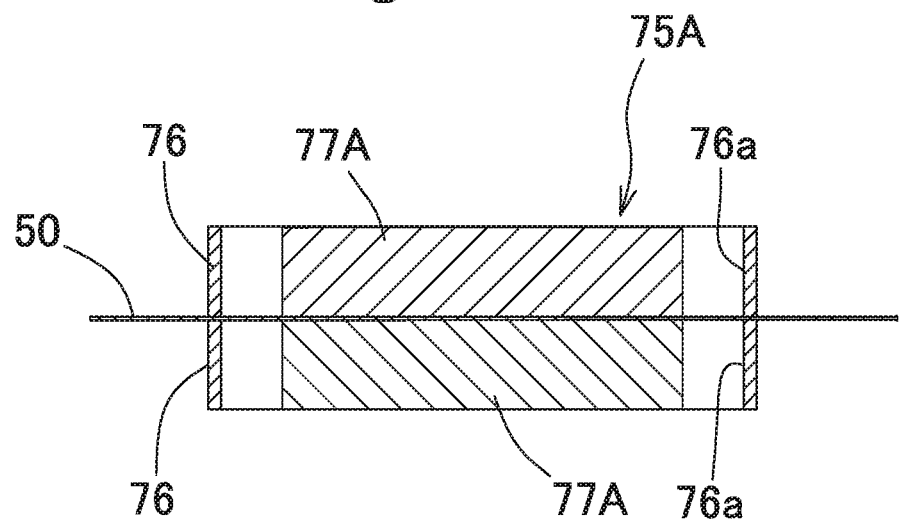
FIG. 17A is a longitudinal cross-sectional view showing a major part of a machining device immediately before extrusion of a raw metal plate, in a manufacturing method using a machining device of another configuration.
Figure 17B:
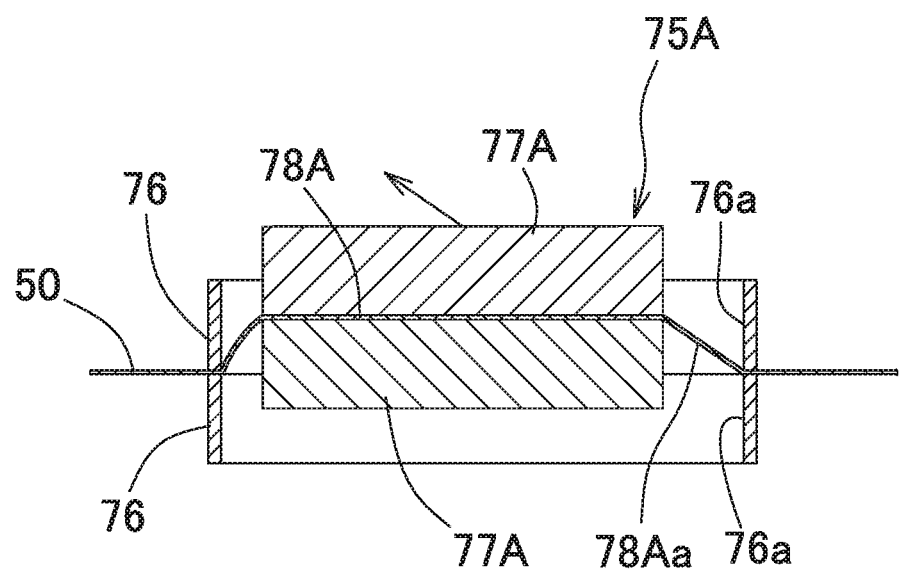
FIG. 17B is a longitudinal cross-sectional view showing the major part of the machining device immediately after extrusion of the raw metal plate, in the manufacturing method using the machining device.

(6) As shown in FIGS. 17A and 17B, an NC machine 75A having a pair of extrusion tools 77A capable of holding a raw metal plate 50 without slippage may be used instead of the extrusion tool 77 of the NC machine 75. In this case, for example, as shown in FIG. 17A, the raw metal plate 50 is held by the holding tools 76 and by the extrusion tools 77A inside the holding tools 76. In this state, as shown in FIG. 17B, the holding tools 76 and the extrusion tools 77A are relatively moved in the thickness direction of the raw metal plate 50 to extrude the raw metal plate 50, and the holding tools 76 and the extrusion tools 77 are relatively moved in the direction (radial direction of the extrusion tools 77A) orthogonal to the thickness direction to form a projecting part 78A, and thereafter, a tensile force is caused to act on a side opposite to the side to which the tools 76 and 77 have been moved in the orthogonal direction, thereby machining a thin peripheral wall part 78Aa having a reduced thickness. Therefore, using the NC machine 75, a desired portion in the circumferential direction around the combustion chamber hole 12 can be made thin by changing the direction of the relative movement of the holding tools 76 and the extrusion tools 77A in the orthogonal direction. Then, unnecessary portions are removed with the thin part being left, and a gasket-constituting plate having a folded-back part 14, a superposition part 29, a thin flat part 33a, etc., can be manufactured by using the thin part. However, a thin part may be formed by relatively moving the holding tools 76 and the extrusion tools 77A only in the orthogonal direction, without extruding the raw metal plate 50 in the thickness direction. As in the above (4), when the raw metal plate 71 is used instead of the raw metal plate 50, or when the contact surface of the extrusion tool 77A to the raw metal plate 50 is configured similarly to the drawing punch 41A and the knockout 45A, it is possible to machine the folded-back part 14 of the gasket-constituting plate 11, the folded-back part 14 of the gasket-constituting plate 11D shown in FIG. 5, or the thin flat part 33a of the gasket-constituting plate 33 shown in FIG. 6 such that the thickness thereof varies between the proximate portions SB and the distant portions RB.

(7) A thin part 23B, having a reduced thickness, may be formed along the periphery of each head bolt insertion hole 18, or a thin part 23W, having a reduced thickness, may be formed along the periphery of each cooling water hole 22 as shown by dotted lines in FIG. 1. Upon machining the head bolt insertion hole 18 and the cooling water hole 22 in the above case, a thin part may be machined over the periphery of each hole or a thin part may be partially machined along the periphery of each hole, through the same method as in the case where the thin flat part 33a of the gasket-constituting plate 33 shown in FIG. 6 is machined.

Figure 18:
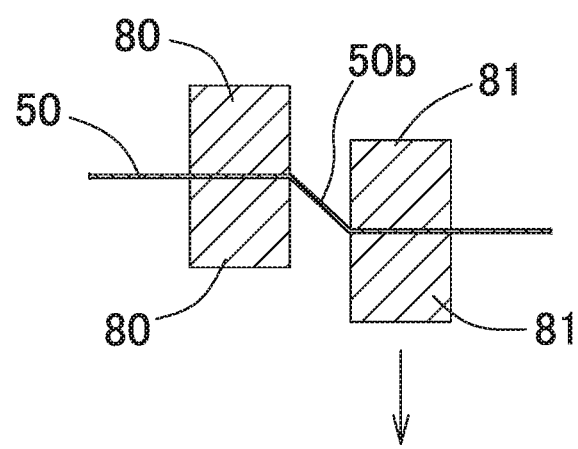
FIG. 18 is a diagram for explaining a manufacturing method using a machining device of another configuration.

(8) As shown in FIG. 18, a raw metal plate 50, a specific portion of which is to be machined thin, is held at both sides of the specific portion with a pair of clampers 80 and 81. One clamper 80 is moved to be relatively separated from the other clamper 81 in the in-plane direction or thickness direction of the raw metal plate 50, whereby the specific portion 50b of the raw metal plate 50 can be locally elongated and made thin.

The gasket-constituting plate manufacturing method according to the present invention is also applicable to manufacturing of a gasket-constituting plate of a head gasket of a single-cylinder engine as long as the gasket-constituting plate is made of metal and has a thin part in which the thickness of the plate is locally reduced. Furthermore, the gasket-constituting plate manufacturing method according to the present invention is also applicable to manufacturing of a gasket-constituting plate disposed between a cylinder head and an exhaust manifold, a gasket-constituting plate disposed between a cylinder head and an intake manifold, a gasket-constituting plate used in a piston type compressor or the like, a gasket-constituting plate used in other industrial equipment, etc.

While the invention has been described in detail, the foregoing description is in all aspects illustrative and not restrictive. It will be understood that numerous other modifications and variations can be devised without departing from the scope of the invention.

What is claimed is:

1. A method for manufacturing a gasket-constituting plate made of metal, the gasket-constituting plate having an annular thin part whose thickness is set to be less than a thickness of a general part, the method comprising:
   (a) holding a raw metal plate without slippage by a pair of holding tools each having an extrusion hole, with holding a part-to-project, of the raw metal plate, facing the extrusion hole, by a pair of extrusion tools capable of holding the part-to-project without slippage; and moving the holding tools and the extrusion tools relatively in a thickness direction of the raw metal plate, and moving the holding tools and the extrusion tools relatively in a direction orthogonal to the thickness direction, thereby forming a projecting part in the raw metal plate, and a thin peripheral wall part which is thinner than the raw metal plate, at an outer peripheral portion of the projecting part, the thin peripheral wall part having a thickness that is partially further reduced on a side opposite to a side where the holding tools and the extrusion tools are relatively moved in the direction orthogonal to the thickness direction; and
   (b) removing an unnecessary portion of the raw metal plate, with the thin peripheral wall part being left.

2. The method for manufacturing a gasket-constituting plate according to claim 1, further comprising folding back the thin peripheral wall part to form a folded-back part.

3. The method for manufacturing a gasket-constituting plate according to claim 1, further comprising folding back the thin peripheral wall part around a midway portion, of the thin peripheral wall part, in a radial direction between an inner peripheral edge and an outer peripheral edge of the thin peripheral wall part, to form a folded-back part.

4. The method for manufacturing a gasket-constituting plate according to claim 1, further comprising machining the thin peripheral wall part into a plate-shaped thin flat part.

5. The method for manufacturing a gasket-constituting plate according to claim 1, wherein
   the gasket-constituting plate is a component of a head gasket interposed between a cylinder block and a cylinder head of an engine,
   the gasket-constituting plate is provided with one or a plurality of combustion chamber holes, and a plurality of head bolt insertion holes into which head bolts for fixing the cylinder head are inserted, and
   the thin part is provided around at least one combustion chamber hole among the one or a plurality of combustion chamber holes so that a proximate portion thereof to a head bolt insertion hole corresponding to the at least one combustion chamber hole is thinner than a distant portion thereof from the head bolt insertion hole.

6. The method for manufacturing a gasket-constituting plate according to claim 1, wherein
   the gasket-constituting plate is a component of a head gasket interposed between a cylinder block and a cylinder head of an engine,
   the gasket-constituting plate is provided with one or a plurality of combustion chamber holes, a plurality of head bolt insertion holes into which head bolts for fixing the cylinder head are inserted, and a cooling water hole which allows cooling water to pass therethrough, and
   the thin part is provided around at least one hole among the one or a plurality of combustion chamber holes, the plurality of head bolt insertion holes, and the cooling water hole.

* * * * *